United States Patent [19]

Smith

[11] Patent Number: 4,879,165
[45] Date of Patent: * Nov. 7, 1989

[54] LIGHTWEIGHT ARMOR

[76] Inventor: W. Novis Smith, 412 S. Perth St., Philadelphia, Pa. 19147

[*] Notice: The portion of the term of this patent subsequent to Mar. 22, 2005 has been disclaimed.

[21] Appl. No.: 208,969

[22] Filed: Jun. 20, 1988

[51] Int. Cl.⁴ .......................... B32B 7/02; F41H 1/02; E06B 9/00; E04B 2/02
[52] U.S. Cl. ..................... 428/212; 428/113; 428/323; 428/911; 2/2.5; 2/6; 2/412; 89/36.02; 89/36.11; 89/36.12; 109/49.5; 109/80; 114/9; 244/121; 296/188
[58] Field of Search ............... 428/113, 323, 302, 212, 428/911; 2/2.5, 6, 412, 411; 89/36.02, 36.11, 36.12; 109/49.5, 80; 114/9-14; 244/121; 296/188

[56] References Cited

U.S. PATENT DOCUMENTS

| | | | |
|---|---|---|---|
| 3,471,460 | 10/1969 | Rees | 525/329.9 |
| 4,468,499 | 8/1984 | Seigfried et al. | 525/301 |
| 4,574,105 | 3/1986 | Donovan | 428/233 |
| 4,678,702 | 7/1987 | Lancaster et al. | 428/911 |
| 4,732,803 | 3/1988 | Smith | 428/212 |
| 4,732,944 | 3/1988 | Smith | 525/329.9 |

Primary Examiner—Marion C. McCamish
Assistant Examiner—Nizar M. Ibrahim
Attorney, Agent, or Firm—John Lezdey

[57] ABSTRACT

Lightweight armor or high impact structures comprising lamina-like structures comprising zones of decreasing Young's modulus and increasing elongation characteristics. The structure contains at least one ionomer composite having aramid or linearly crystalline polyethylene fibers arranged to dissipate impact forces laterally.

13 Claims, 1 Drawing Sheet

LIGHTWEIGHT ARMOR

BACKGROUND OF THE INVENTION

1. Field of the Invention

The present invention relates to lightweight armor and high impact structures. More particularly, the invention relates to lightweight armor, composite structures comprising an ionomer and an aramid and/or linearly crystallized polyethylene fiber structure.

2. Prior Art

There is a continuing need to improve the stopping power of lightweight composite armor which is used for spall shields, helmets and personal ballistic vests and armor. Layers of woven Kevlar (aramid) is the most common ballistic shield used for personal protection today. Spectra (linearly crystallized polyethylene) is also being evaluated with success for these same applications. As larger projectiles or fragments come into contact with these structures, the yarns go into tension and the load is transferred along the axis of the fibers and filament yarns. The projectile is decelerated at this moment as long as the yarns of the ply hold. As these yarns break the load is transferred to the fabric of the next ply and so on.

In order to improve the stopping power of these woven (or even nonwoven) structures, some means is needed to add greater resistance to the deformation/penetration ability of the projectile and to prevent the projectile from slipping past the yarn. An optimum fabric resin composite contains about 35% resin. If this same amount of resin could be added to a high strain-type ballistic fabric such as Kevlar 29 or Spectra in a manner that is reinforcing and aids in the deceleration of the projectile, then an enhanced lightweight protective ballistic armor can be formed.

The problem is, up to now, only rigid-type resins (thermosets) have been used with these high strain, high tenacity woven fibers. These resins being rigid, clamp or stop the high strain fiber from going into tension, thereby concentrating the impact load on a smaller cross sectional area of fabric. Therefore, the ability of the ballistic fabric to stop projectiles is lessened with rigid resins.

It is common practice to add poorly bonding resins such as phenolic or modified polyester to these high strain ballistic fabrics in order to form composites in which the resin does little more than keep out water. In addition, often a nonbonding rubber latex is added to enhance nonbonding to the high strain, high tenacity fiber (Kevlar), in order that the high strain fiber breaks free of the composite matrix and goes into tension along its length, immediately and thus carrying the impact load over as large an area as possible, increasing the stopping power of the ballistic fabric stack in the weak composite form.

Ideally, it would be a significant improvement if the matrix resin had about the same or faster elastic response properties to high velocity impact (ballistic). Then the impact load is absorbed both by the matrix and by the high strain fiber simultaneously and the load is distributed laterally (over the widest area) to the greatest extent. In this latter situation, the matrix resin is absorbing part of the load and yet not causing a lessening of the Kevlar to go into lateral tension and thereby involving the maximum amount of fibers in the deceleration process. The resin itself will help transfer the load from fiber to fiber. In this situation, there are two criteria that must be met: (1) the matrix resin must respond as fast or faster than Kevlar to ballistic impact and begin to stretch and spread the load immediately on impact, and (2) the resin must form a good bond to the high strain fiber for maximum results. This is contrary to the commonly used design criteria for these lightweight composites.

Smith U.S. Pat. No. 4,732,803, which is incorporated herein by reference, discloses an armor structure which can be utilized together with the present invention.

Clausen U.S. Pat. No. 4,186,648, et al, which is incorporated herein by reference, describes an armor wall structure comprising a plurality of woven fabric laminates of polyester resin fibers arranged and supported in and by a resinous matrix with a filler of particulate metal abrading material and woven fabric laminates. This reference discloses abrading material which can be used in the present invention.

Donovan U.S. Pat. No. 4,574,105 discloses penetration resistant textile panels with plies of nylon and Kevlar.

Seigfried U.S. Pat. No. 4,468,499 et al, which is herein incorporated by reference, discloses chemically blended thermoplastic interpenetrating polymer network compositions.

Rees U.S. Pat. No. 3,471,460, which is herein incorporated by reference, discloses ionomers which can be utilized in the invention.

Smith U.S. Pat. No. 4,732,944, which is herein incorporated by reference, discloses amine modified ionomers which may be used in the present invention.

There are many lightweight materials which have high strength and elasticity but do not respond well when subjected to impact velocities over 2000 ft/sec. High modulus and high strength materials are usually brittle and crack or notch sensitive. Once damaged, these high modulus and high strength materials lose a great deal of their stopping power or impact strength due to crack sensitivity.

Elastomeric materials are not usually crack or damage sensitive but can be readily penetrated at high impact velocities.

Chopped glass fibers and most other material fillers are known to usually increase the impact resistance of resins with which they are compounded because they act as stress concentrators. However, glass fibers and fillers alone further tend to embrittle ductile and semiductile polymers. Addition of plasticizers and energy-absorbing constituents such as rubbers tend to overcome the embrittlement sensitivity or crack propagation but decrease the energy dissipation away from the lateral direction and decrease penetration resistance per unit area.

It is desirable to provide armor which can stop "needle penetration"; that is, penetration by sharp pointed objects such as ice picks, shrapnel, high velocity small caliber bullets, and the like.

The use of woven fiber structures alone has been ineffective in providing enhanced stopping ability without a major increase in mass or thickness for stopping high impact small cross section projectiles such as needles, ice picks, or small caliber bullets.

In the specification and claims the term "ionomer" or "ionomer resin" mean an extrudable resin comprising ionically crosslinked ethylene-methacrylic acid and ethylene-acrylic acid copolymers. Properties which distinguish these ionomer resins from other polyolefin heat-seal polymers are tear resistance, abrasion resistance, solid-state toughness and resistance to oil-fat permeation. The starting ionomer resins are generally available as either a partially neutralized sodium or a zinc ionomer, and are available in a wide variety of grades. However, the esters or the non-neutralized acid form of the resin are also adaptable to the present invention.

Various grades of ionomer resins are available for extrusion coating and film extrusion. A very wide variety of partially neutralized ionomer resins are manufactured by E. I. DuPont de Nemours and Company under the registered trademark "SURLYN" or by Dow as "PRIMACORE".

One ionomer or ionomer resin of the invention is obtained by combining a copolymer of ethylene-methacrylic acid or ethylene-acrylic acid and a polyamine which contains at least one R—$CH_2$—$NH_2$ group, and the R may contain: (—$CH_2NH_2$)$_x$; (—$NH_2$)$_x$; or (R'R''NH)$_y$, where x=1 or more, and y=0 or more. R' and R'' may be any organic groups. The preferable structure of the diamine is:

$$NH_2CH_2—(R)—CH_2NH_2 \quad (1)$$

where R contains from one to twenty five carbon atoms; R may be aliphatic, alicylic or aromatic; and R may also contain:

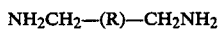  (2)

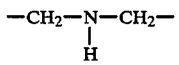

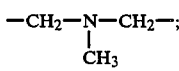

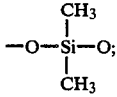

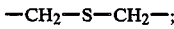

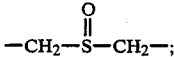

SUMMARY OF THE INVENTION

The present invention relates to novel lightweight armor and to reinforcement structures for parts subjected to high impact forces. More particularly, the invention is concerned with lightweight composite armor comprising one or more laminates of an aramid and/or linearly crystallized polyethylene in an ionomer matrix. Preferably, the ionomer is an amine modified ionomer.

The fibers may be in the form of a woven or nonwoven fabric or fibers arranged to provide the same effect as fabric. The yarns making up the fabric and the fabric may be of a wide variety of denier, i.e. from about 200 to 2000 denier may be employed. The fibers are preferably oriented so as to transfer impact energy laterally. Advantageously, the fibers are woven. When the fibers are nonwoven filaments, the amount and alignment of the fibers are such as to eliminate voids and to rapidly dissipate impact energy laterally such as in a compression molded sheet.

It is advantageous that the zones of ionomer and fibers are arranged in zones of decreasing Young's modulars and increasing elongation characteristics as disclosed in U.S. Pat. No. 4,732,803.

It is advantageous to provide an outer protection layer against needle penetration having metallic or ceramic particles, platelets, grit or the like which are held within a resin, pressed into the ionomer layer, or the like.

It is therefore an object of the invention to provide lightweight armor having improved missle stopping power per given weight and thickness.

It is another object of the invention to provide a means to prevent or stop the penetration of needle-like projectiles such as ice picks, small caliber bullets and small fragments.

It is yet another object of the invention to provide armor which can deflect significant impact blows without undue stress concentration.

It is still another object of the invention to provide lightweight armor which can be utilized alone or with other armor structures.

It is a further object of the invention to provide a lightweight military helmet that has greater penetration resistance and is more economical to manufacture through compression molding.

It is yet a further object of the invention to provide a reinforcement for military vehicles bodies, helicopters and for boat hulls which does not add a large amount of weight or bulk.

It is still a further object of the invention to provide a lightweight reinforcement which can be used to back up more rigid armor structures or as one segment of more complex armor structures such as described in U.S. Pat. No. 4,732,803.

Other objects and a fuller understanding of the invention will be had by referring to the following description and claims of a preferred embodiment, taken in conjunction with the accompanying drawings, wherein like reference characters refer to similar parts throughout the several views.

BRIEF DESCRIPTION OF THE DRAWING(S)

FIG. 1 is a side sectional view of an armor composite of the invention with a layer to stop needle-like projectile penetration; and FIG. 2 is a side sectional view of an armor composite with another form of needle-like projectile penetration protection.

DESCRIPTION OF THE PREFERRED EMBODIMENT

Figure 1:
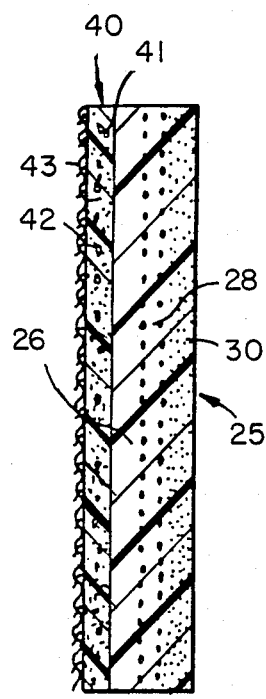

Although specific terms are used in the following description for the sake of clarity, these terms are intended to refer only to the particular structure of the invention selected for illustration in the drawings, and are not intended to define or limit the scope of the invention.

Figure 2:
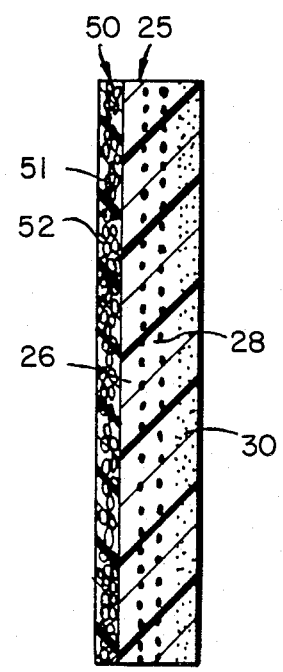

Referring now to the drawings, as seen in FIGS. 1 and 2, there is illustrated lightweight armor structures which can be used alone or in combination with other armor structure. Each structure shows the optional needle-like projectile penetration protection zone.

The fibers which are utilized in the composite 15 may comprise hybrids, for example, aramid and carbon; aramid and glass; aramid, carbon and glass; carbon, glass and Spectra, etc. Hybridization of the fibers not only reduces costs, but in many instances improves the performance in armor structures. It is known that aramid fiber and carbon are significantly lighter than glass fiber. The specific modulus of elasticity of aramid is nearly twice that of glass, while a typical high tensile strength-grade of carbon fiber is more than three times as stiff as glass in a composite. However, aramid fiber has a lower compressive strength than either carbon or glass, while carbon is not as impact resistant as aramid. Therefore, a hybrid of the two materials results in a composite that is (1) lighter than a comparable glass fiber-reinforced plastic; (2) higher in modulus, compressive strength and flexural strength than an all-aramid composite; and (3) higher in impact resistance and fracture toughness than an all-carbon composite.

Optionally, the next zone or layer is a resin having a lower Young's modulus and greater elongation than the adjacent zone. The resin-like composite may have a similar resinous matrix to that in composite but suitably modified with more elastic fibers and/or resin modifiers.

In the arrangement illustrated in FIGS. 1 and 2, an outer metallic zone may be used as a sacrificial layer to slow down the velocity of a projectile (i.e. bullet, shell fragments) so that the high strength lower modulus material can respond and provide deflection. The projectile then dissipates the impact energy in the zone with the fiber reinforcement. The entire composite, and not only the fibers, provide the stopping or slowing of the projectile because of the combined elongation under load with the rapid lateral transfer of energy across the plane or face of the armor. The further dampening of the energy and stopping of the missile occurs in the final zone.

There may also be formed an armor structure wherein a sacrificial surface metal is the outer zone and a composite comprising an ionomer matrix and woven fibers forming the adjacent zone. A further interior zone can be a resin having a suitable filler of fibers.

As shown in FIG. 1, the armor composite 25 may be provided with an outer layer 40 comprising ceramic grit 41 in a resinous or adhesive matrix 42. Optionally, a covering may be placed over the outer layer 40, such as a cloth 43, to provide an aesthetic appearance.

A second zone 26 comprises an ionomer matrix having plies 28 of aramid or linearly crystallized polyethylene embedded therein. The structure may also include aramid and/or linearly crystallized polyethylene fibers 30.

FIG. 2 illustrates an armor composite with plies 28 and fibers 30 having an outer layer 50 which contains metallic or ceramic platelets 51 that is formed by heat softening a portion 52 of the thermoplastic and pressing the platelets therein. There should be sufficient platelets utilized to form an overlap of the platelets which prevents needle penetration.

The particles, grit, platelets or tiles and the like may be formed of any suitable metallic or ceramic materials. The platelets may be flat, concave, round, oval, squared or the like configured materials which overlap each other to prevent needle-like projectile penetration. The platelets are advantageously about 0.25-0.50 inches in length. The particles or grit are preferably about −3 to −8 mesh.

The ceramic materials which can be utilized in the present invention comprise the oxides or mixtures of oxides of one or more of the following elements: magnesium, calcium, strontium, barium, aluminum, scandium, yttrium, the lanthanides, the actinides, gallium, indium, thallium, silicon, titanium, zirconium, hafnium, thorium, germanium, tin, lead, vanadium, niobium, tantalum, chromium, molybdenum, tungsten and uranium. Compounds such as the carbides, borides and silicides of boron, silicon and the transition metals may also be used. Other suitable ceramic material which may be used are zircon-mullite, mullite, alpha alumina, sillimanite, magnesium silicates, zircon, petalite, spodumene, cordierite and aluminosilicates. Suitable proprietary products are "MATTECEL" (Trade Name) supplied by Matthey Bishop, Inc., "TORVEX" (Registered Trademark) sold by E. I. duPont de Nemours & Co., "W1" (Trade Name) sold by Corning Glass and "THERMACOMB" (Registered Trademark) sold by the American Lava Corporation. Another useful product is described in British Pat. No. 882,484.

Other suitable active refractory metal oxides include, for example, active or calcined beryllia, baria, alumina, titania, hafnia, thoria, zirconia, magnesia or silica, and combination of metal oxides such as boria-alumina or silica-alumina. Preferably the active refractory oxide is composed predominantly or oxides of one or more metals of Groups II, III and IV of the Periodic Table.

Among the preferred compounds may be mentioned YC, $TiB_2$, $HfB_2$, $VB_2$, VC, VN, $NbB_2$, NbN, $TaB_2$, $CrB_2$, $MoB_2$, $W_2B$, and S-2 glass. The platelets are advantageously prepared from oxides such as $TiO_2$; nitrides such as BN; carbides of boron and tungsten; borides such as $TiB_2$ and TiB; metals for example, steel, Ni, Ti, and the like.

The ratio of the surface area to the thickness of the tile or particle is a major consideration for maximum strength or impact resistance of this ceramic ply. The thicker the tile or particle, the heavier the weight contribution per unit area of armor. If the goal is to design an armor barrier with the maximum stopping power per unit weight, then there are several design criteria which must be applied:

In the case of high velocity, small cross section fragments, the pressures per square inch are extremely high. Therefore, in order to begin deceleration of the projectile, the surface must have a maximum compressive strength for a given thickness. Ceramic materials and nonfiber reinforced materials are weaker in tension and fail in tension. Therefore, for a given thickness of particle or tile, the tensile force along the plane of the tile or particle increases as the particle becomes wider for a given impact force. This is because the moment increases as the support distance from the center of impact increases. The smaller the cross section of the tile or particle, the more the particle will be under purely compressive force. For a given ceramic material, thickness, and high impact force, there will be an optimum width of particle. However, with a narrower particle, it is more likely that a projectile will find a weaker place between the tiles or particles. The use of two thinner layers enhances the use of discrete particles or tiles to minimize the chance of the projectile hitting a weak juncture between particles or tiles in the armor.

If the tiles are too wide in an area, they will break more readily after being hit. There is an optimum cross sectional area for each material depending on the shape of the particle and the width and the hardness. It has been found that coarse grit ($-2$ to $-12$) works very well in that it has high compressive strength and will not crush. It is coarse enough to prevent it from being pushed aside and will engage the fabric, and it has a large enough cross section to have a high probability of interacting with the projectile. It is preferable to have the grit flatter or in chip form when possible to minimize the weight per unit area for maximizing stopping power and minimizing amount of unprotected area. The use of a grit is also much cheaper and permits the formation of a hard coated complex armor shape.

The most effective way to use this ceramic layer is to cover a graduated armor piece with it at or near the outer surface so that it completes the entire range from super hard surface to totally elastic layers on the back side of the armor.

Thus, according to the present invention, the maximum stopping power per given weight and thickness is achieved when the impact force of a missile or projectile is spread laterally as quickly as possible by means of the fibers and resin. The faster and more effectively this is performed, the less the force per unit area that each successive zone or layer is subjected. By the present arrangement, the maximum force of impact is converted as rapidly as possible into deflection and subsequent dampening to zero rather than forcing damage or allowing penetration through all of the layers of the armor structure.

Although the invention has been described with a certain degree of particularity, it is understood that the present disclosure has been made only by way of example and that numerous changes in the details of construction and the combination and arrangement of parts may be resorted to without departing from the spirit and scope of the invention.

I claim:

1. An armor structure or high impact structure comprising a plurality of zones, at least one zone comprising an extruded ionomer resin, said zone of ionomer resin having incorporated therein a fibrous structure comprising an aramid and/or linearly crystallized polyethylene arranged in an amount and direction to transfer impact forces laterally, said zones being arranged in zones of decreasing Young's modulus and increasing elongation characteristics.

2. The armor structure of claim 1 wherein said fibrous structure comprises a multiplicity of woven webs.

3. The armor structure of claim 2 wherein said fibrous structure comprises poly (p-phenylene terephthalamide).

4. The armor structure of claim 1 wherein said fibers are linearly crystallized polyethylene.

5. The armor structor of claim 1 wherein the fibrous structure is a mixture of aramid and a member selected from the group consisting of linearly crystallized polyethylene, carbon and glass.

6. The armor structure of claim 1 wherein one zone comprises aramid fibers and another zone comprises linearly crystallized polyethylene.

7. The armor structure of claim 1 wherein an outer zone comprises an ionomer resin matrix having ceramic or metallic particles incorporated therein to stop needle-like projectile penetration.

8. The armor structure of claim 7 wherein said ceramic particles are selected from the group consisting of silicon carbide, boron carbide, titanium diborde and tungsten carbide.

9. The armor structure of claim 7 wherein the out lamina comprises an ionomer matrix having platelets incorporated therein to stop needle-like projectile penetration.

10. The armor structure of claim 1 wherein a zone to stop needle-like projectile penetration comprises the outer portion and said zone comprises ceramic grits, particles or tiles.

11. The armor structure of claim 1 which is body armor.

12. The armor structure of claim 1 which is structural armor.

13. An armor structure or high impact structure comprising at least one zone of extruded, partially neutralized, sodium or zinc ionomer resin, said zone of ionomer resin having incorporated therein a fibrous structure comprising an aramid and/or linearly crystallized polyethylene arranged in an amount and direction to transfer impact forces laterally, said ionomer resin being formed with a polyamine.

* * * * *